United States Patent Office 3,426,665
Patented Feb. 11, 1969

3,426,665
APPARATUS ENABLING A CAMERA TO OPERATE WITH DIFFERENT LENGTHS AND THICKNESSES OF FILM
Keisuke Maeda, Osaka, Japan, assignor to Minolta Camera Kabushiki Kaisha, Osaka, Japan, a corporation of Japan
Filed Dec. 1, 1965, Ser. No. 510,753
Claims priority, application Japan, Feb. 5, 1965, 40/6,461
U.S. Cl. 95—31          7 Claims
Int. Cl. G03b 19/04

ABSTRACT OF THE DISCLOSURE

A camera for use with 12 exposure 120 film and 24 exposure 220 film which has a manually operated member for resetting the counter-mechanism to zero, after completion of the number of exposures corresponding to the highest number of the counter. A resilient film guide is supported in the camera for movement between two positions, in which different guide slots are provided for accommodating different thicknesses of film.

---

The present invention relates to a novel and useful device to be used in a camera in which the usual 6 x 6 cm. 12 exposure film as well as longer film may effectively be used.

As well known, there are in general two types of roll films and consequently two types of cameras. One type, often called 35 mm. film in view of the width thereof, has no overlapped cover paper along the length thereof and is accommodated in a magazine adapted to be placed in the camera. After completion of photographing, the film is wound back into the magazine so as to be taken out of the camera. This invention is concerned with a camera in which the other type of film is used. This is the so-called Brownie type film capable of photographing 8 scenes of 6 x 9 cm. or 12 scenes of 6 x 6 cm., the latter being commonly called No. 120 film, is overlapped with a shading paper having a leading portion, a middle portion extending along the entire length of the film and a trailing portion.

Recently in replacement of said No. 120 film, a longer film capable of photographing 24 scenes of the same size has appeared on the market and is commonly referred to as No. 220 film and shall be called herein a longer or long extended film. This longer film has no overlapped paper web but merely two lengths of paper web at each extremity thereof, leader i.e. and trailer papers. Thus the camera can handle two film lengths to be photographed with substantially the same diameter of the roll. Since the part of film to be exposed is bare as in 35 mm. film, the diameter of the roll is substantially the same as the usual Brownie film.

Thus this longer film may be used in the same camera which employs 6 x 6 cm. 12 exposure film. However, as the counter mechanism for indicating the number of scenes photographed would be inoperative after the first 12 scenes, the back cover lid of the camera has to be opened in the dark room to reset a counter to zero. Furthermore when the longer film is used in the usual camera, the urging means provided at the film guiding mechanism will not be able to hold the film in a desirable flat photographing position due to the decrease of the thickness of the film.

This invention intends to avoid and overcome the disadvantages, as referred to above, by providing a device whereby the counter mechanism and film guiding mechanism may be effectively operative both for the usual 6 x 6 cm. 12 exposure film and for longer film.

An object of the present invention is to provide a counter mechanism for the long extended type of roll films, as referred to above adapted to be photographed continuously from the 13th scene to 24th scene by a simple resetting operation simple reformation, without opening the back-cover of the camera. Said counter mechanism is, of course, usable for photographing the first 12 scenes without change.

Thus, according to the apparatus of the present invention, in addition to the usual counter-mechanism capable of counting 12 exposures of 6 x 6 size, a pivotable three forked lever is provided which is externally operable to reset the counter mechanism after the first twelve exposures have been made whereby the next twelve exposures on the 24-exposure film will be counted. The present invention achieves the following excellent improvements by a simple and consequent low cost reconstruction: In the reconstruction just referred to, not only can 12 exposures having a size of 6 x 6 be made, but also 24 exposures from a long extended type of film can also be made. Thus, the camera of the present invention will be entirely free from such inconveniences as opening the back cover of the camera in a dark room, in the course of photographing, to return the counter to zero, and thereafter again resume the photographing from the 13th exposure to the end. Therefore, a continuous counting can be conducted for 24 exposures for an extended type film merely by the single operation of a handle.

Another object of this invention is to provide a film guiding mechanism adapted for use in a camera for either of the two types of roll films, i.e. one with leader paper attached and the other without it. For accomplishing such an object, said film guiding mechanism defines a film slot by means of a press-fitting plate detachably secured to the back-cover of camera as well as a stepped portion, the height of which is equal to the thickness of the leader paper provided on said press-fitting plate.

According to the apparatus of this invention, as the device of the present invention has a slot film guide, curling of roll film is sufficiently prevented and consequently the planar form of the roll film is retained. Moreover, as distinguished from the usual pushing type, no sliding pressure is used, and no damage can occur. Moreover, as the winding of the film can be effected easily and, since the fitting plate is attached or detached by simple operations such as, pushing, sliding, detaching; and further since the plate is rotatable through 90° between a flat portion and the stepped portion the slot clearance may coincide with either No. 220 film or No. 120 film.

In the following disclosure, the present invention will be described in detail in connection with one embodiment illustrated in the accompanying drawing, in which.

Throughout the drawings, similar parts are designated by the same numerals.

Figure 1:
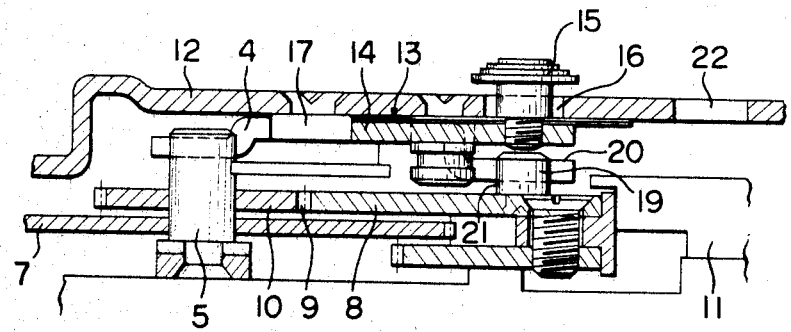
FIG. 1 is an enlarged sectional view of the counter mechanism as taken along line II—II of FIG. 2.
Figure 2:
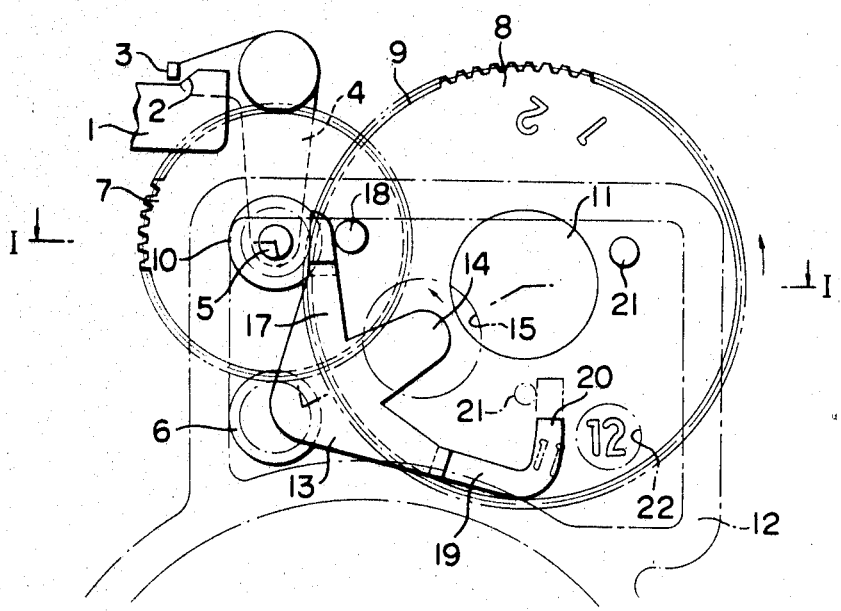
FIG. 2 is a plan view thereof.

In FIGS. 1 and 2, which illustrate a counter mechanism for a long extended type of roll film according to the present invention, a crank lever 4 provided with a bent portion 3 in mesh with an inclined face 2 of a sliding lever 1 which moves laterally by opening or closing the back cover (not illustrated) of the camera is conveniently pivoted on an axle 5 at the other end. Also mounted on said axle 5, are a driving gear 7 rotating with a friction roller 6 when film is being wound, and a small gear 10 meshing with a large gear 9 of counter mechanism 8 which is energized by a well-known spring seeking the zero mark, said counter 8 being secured to a central sleeve 11. On the other hand, a three forked lever 13 is pivotally connected to the side plate 12, and is spring-loaded in a manner not shown, to be urged in clockwise rotation. A knob 15 is secured to the middle lever 14 of said three forked lever at an end thereof, which passes through hole 16 of side plate 12, and a left lever 17 of the three forked lever is halted in the clockwise rotation by means of a stationary pin 18 of counter 8. A bent end 20 of right lever 19 forms a stop for a pin 21 of counter 8 to return to zero against the axle 5 of small gear 10.

Thus, according to the construction referred to above, when twelve scenes have been photographed after loading the camera with films in the usual practise, the numerical symbol for scene "12" is seen through a peep hole 22 formed in the side plate 12. As a result, when the knob 15 is turned against a spring (not illustrated) counter-clockwise, the axle 5 is pushed down to permit the bell crank lever 4 to turn clockwise, with the result that the small gear 10 is disengaged from the large gear 9 of counter 8. Said counter 8 is then turned counterclockwise by means of its own spring, and simultaneously the pin 21 is returned to zero by abutting against the bent portion 20 of advanced lever 19 and a preceding numeral "1" appears through peep hole 22, and a second numeral "1" comes to indicate completion of photographing of the 13th scene. When photographing is continued further, numeral 12 represents twelve additional film scenes i.e. a total of twenty-four exposures when the roll is completed. When the film is wound further, the counter 8 is stopped by the cut-off portion of the tip, and only the film advances until the leader paper is wound up at the final end.

When the back cover is opened, the sliding lever advances to the left from the position shown in FIG. 2 by a spring acting thereon, and the small gear 10 is detached from the counter 8 by the bell crank lever 4 which is revolved clockwise under the action of inclined surface 2 and bent portion 3. The counter mechanism is returned automatically to zero. Upon closing the back cover, the inclined surface 2 of sliding lever 1 advances to the right and is lowered and the small gear 10 comes again in mesh with the member 8 by the bell crank lever 4 rotating counterclockwise by the bent portion 3. The knob 15 need not be provided on the middle lever 14 and can be provided on either the left or right lever.

Figure 3:
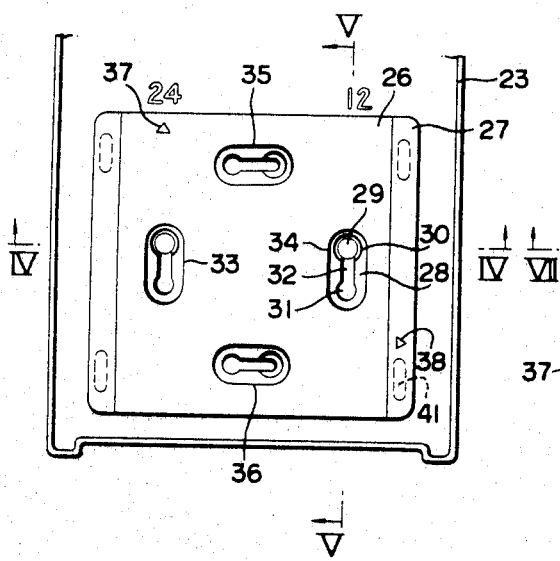
FIG. 3 is a plan view of the film-guiding mechanism of the present invention.
Figure 6:
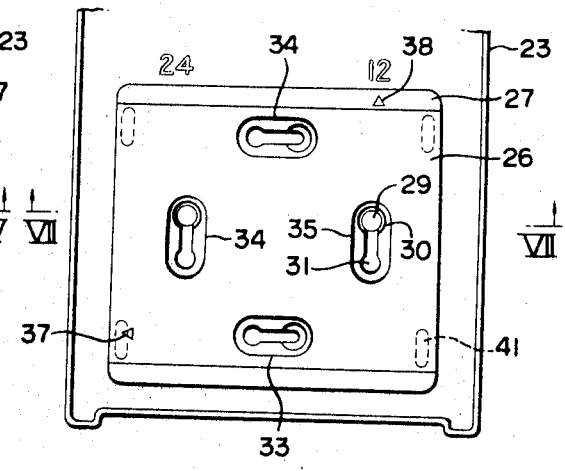
FIG. 6 is a view similar to that of FIG. 3 showing another embodiment of the film-guiding mechanism.
Figure 4:
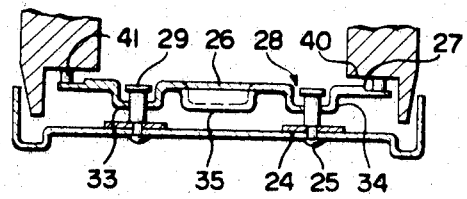
FIG. 4 is a sectional view taken on line IV—IV of FIG. 3.
Figure 7:
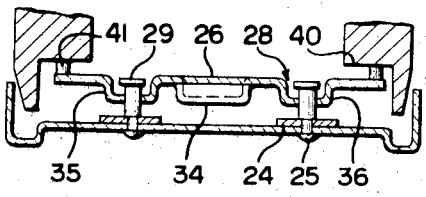
FIG. 7 is a sectional view taken on line VII—VII of FIG. 6.
Figure 5:
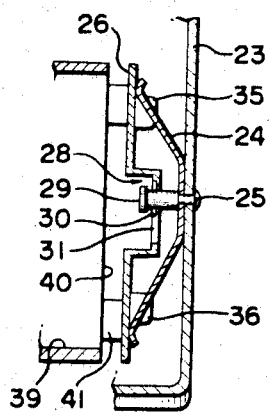
FIG. 5 is a sectional view taken on line V—V of FIG. 3.

Further, in FIGS. 3 to 7 representing the film-guiding device according to the present invention, an approximately square film-fitting plate 26 is secured slidably and detachably to an elastically supporting spring 24 by guiding pins 25, secured in turn to the back cover of camera 23 and the plate 26 possesses a step portion 27, the height of which is equal to the thickness of the leader paper. Each said guiding pin 25 is positioned in a recess 28 formed in the film-fitting plate 26. In this case, a head portion 29 of each guiding pin is inserted in said recess. In said film-fitting plate are two laterally arranged sets of recessed engaging portions 33 and 34 as illustrated in FIG. 3, each of which has a concave step portion 30 engaging the neck portion of a corresponding guiding pin 25, and a large hole 31, through which said head portion is freely passable. The step portion 30 is connected to hole 31 by means of a groove 32 having a width corresponding to the diameter of the neck portion of a guiding pin. Furthermore, other similar engaging recess portions 35 and 36 are also provided with corresponding guiding pins 25 perpendicular to the axial line, i.e. when the film-press-fitting plate 26 is turned around 90° from the present position. On the back cover of camera 23, are provided an index 37 corresponding to designation numeral "24," and another index 38 for numeral 12 showing that the plate 26 has been turned 90° from the former position.

Thus, according to the abovementioned construction, the film advances along a slot formed between a lateral surface 40 of a photographing window 39 of camera, an outside abutment face 41 of the film fitting plate and the film-fitting plate 26 itself. In FIG. 3, as the step portion 27 of the film fitting plate comes in contact with the abutment face 41 of the film-fitting plate, the clearance corresponds to the thickness of a single film by decreasing the height of said step portion, i.e. the thickness of leader paper, and the designation numeral "24" is indicated by the index 37. The use of the extended length type of film No. 220 of 24 exposures is indicated. The film advances in its plane and curling is prevented. When a film attached with leader paper is used, the film-fitting plate 26 is pushed against the elastic holding spring 24, and is slid in the direction of the large holes, so that the film-fitting plate 26 will be detached from the head portion 29 of said guiding pins, when the head portion 29 of guiding pins 25 are coincident with the large holes 31. The film-fitting plate is then rotated counter-clockwise 90°, so that the stepped portion 27 may be free of the abutment face 41 of press-fitting plate 26, for bringing the concave engaging portions 35 and 36 respectively in coincidence with said guiding pin. The pins are then pushed through the large holes 31 and are slid towards the operator. Then, the head portion 29 of said guiding pin advances in the groove 32 to the concave stepped portion 30, and the designation numeral "12" is in correspondence with the index 38 and simultaneously the clearance of the film slot becomes equal to the height itself of the abutment surface 41 above the film sliding surface 40, that is, the sum of the thickness of film and that of the leader paper. Therefore, as said film advances, any curling of the film is prevented and the film is retained in planar form.

What I claim is:
1. In a camera having an exposure counter and a mechanism for setting the counter to zero upon opening and closing a back lid member, an improvement comprising means for manually operating said mechanism to set the counter to zero with the back lid member closed whereby a length of film having more exposures thereon than the highest number of the counter can be utilized in which the increased number of exposures can be counted in sequence after completion of the number of exposures corresponding to said highest number of the counter, and resilient film guide means supported in said camera for movement between two positions in which respective guide slots are provided of different size for accommodating different thicknesses of film, said exposure counter comprising a wheel with characters thereon for indicating number of exposures, a pin fixed on said wheel, said wheel being biassed for angular rotation in one direction; a drive member engaging said wheel to stepwise advance the same as the film is wound in the camera, said mechanism for setting the counter to zero comprising means operable by opening said lid for disengaging siad drive member from said wheel to permit the latter to rotate under the bias thereon to zero position, said means for manually operating said mechanism with the lid closed comprising a pivotable lever biassed for angular rotation in one direction, means on said lever engageable externally of the camera for rotating said lever in the other direction in opposition to the bias force acting thereon, said lever including an arm for displacing said drive member to disengage the same from said wheel when the lever is rotated in said other direction whereby said wheel is rfee to rotate to zero position under the bias force acting thereon, and means on said lever for engaging said pin on the wheel to arrest the same in said zero position.

2. In a camera as claimed in claim 1, a second pin on said wheel for engaging said lever to position the same proximate said drive member as the counter reaches the last character on the wheel.

3. In a camera as claimed in claim 1, wherein said lever is constituted as a three arm lever, one arm being the first said arm, the second including an external knob thereon which is a part of said means for manually operating the counter mechanism, and the third including a bent portion which is part of said means for engaging the pin to arrest said wheel in the zero position.

4. In a camera having an exposure counter and a mechanism for setting the counter to zero upon opening and closing a back lid member, an improvement comprising means for manually operating said mechanism to set the counter to zero with the back lid member closed whereby a length of film having more exposures thereon than the highest number of the counter can be utilized in which the increased number of exposures can be counted in sequence after completion of the number of exposures corresponding to said highest number of the counter, and resilient film guide means supported in said camera for movement between two positions in which respective guide slots are provided of different size for accommodating different thicknesses of film, said film guide means comprising a square plate member, a spring member fixed to said back lid member and engaging said plate member to urge the plate member to operative position in which the slots are formed, means in said camera cooperating with said plate member to define said slots, said plate member having pairs of opposed lateral edges, the edges of one pair forming a boundary for one slot while the edges of the other pair form a boundary for the second slot, and means coupling the square plate member with the back lid member to enable the square plate member to selectively occupy one of said two positions in which the respecitve slot will be formed for the passage of the film.

5. In a camera as claimed in claim 4, wherein said member which couples the plate member to said back lid member comprises a plurality of pins on one of said members, the other member having openings permitting engagement and disengagement with said pins and locking with said pins in the engaged position.

6. In a camera as claimed in claim 5, wherein said pins have enlarged heads, each said opening having a concave step portion for accommodating the head of a pin in flush relation therein, a hole permitting free insertion and removal of the head of a pin and a narrow groove joining said hole and step portion.

7. In a camera as claimed in claim 6, wherein said pins and openings are arranged in symmetrical pairs whereby the square plate is turned 90° in moving between said two operative positions.

References Cited

UNITED STATES PATENTS

| | | | |
|---|---|---|---|
| 2,301,956 | 11/1942 | Kuppenbender et al. | 95—31 |
| 3,103,861 | 9/1963 | Koeppe | 95—31 |
| 3,121,378 | 2/1964 | Lange | 95—31 |
| 3,136,291 | 6/1964 | Irisaw et al. | 95—31 |

NORTON ANSHER, *Primary Examiner.*

R. A. SCHROEDER, *Assistant Examiner.*